US009657885B2

(12) United States Patent
Alexander

(10) Patent No.: US 9,657,885 B2
(45) Date of Patent: May 23, 2017

(54) HOT HOLE CHARGE SYSTEM

(71) Applicant: Brent Dee Alexander, American Fork, UT (US)

(72) Inventor: Brent Dee Alexander, American Fork, UT (US)

( * ) Notice: Subject to any disclaimer, the term of this patent is extended or adjusted under 35 U.S.C. 154(b) by 0 days.

(21) Appl. No.: 14/475,232

(22) Filed: Sep. 2, 2014

(65) Prior Publication Data

US 2014/0367604 A1 Dec. 18, 2014

Related U.S. Application Data

(63) Continuation of application No. 13/425,078, filed on Mar. 20, 2012, now Pat. No. 8,820,242.

(51) Int. Cl.
| | |
|---|---|
| *F42D 3/00* | (2006.01) |
| *E02B 1/00* | (2006.01) |
| *E02B 3/16* | (2006.01) |
| *F16L 59/02* | (2006.01) |
| *F42D 1/10* | (2006.01) |
| *F42D 1/12* | (2006.01) |
| *F42D 3/04* | (2006.01) |
| *E21B 7/00* | (2006.01) |

(52) U.S. Cl.
CPC ............ *F16L 59/028* (2013.01); *E21B 7/007* (2013.01); *F42D 1/10* (2013.01); *F42D 1/12* (2013.01); *F42D 3/04* (2013.01)

(58) Field of Classification Search
CPC .......... E21B 7/007; F16L 59/028; F42D 1/10; F42D 1/12; F42D 3/04
See application file for complete search history.

(56) References Cited

U.S. PATENT DOCUMENTS

| | | | |
|---|---|---|---|
| 1,569,222 A | 1/1926 | Ferrell | |
| 2,044,345 A | 6/1936 | Barab | |
| 2,078,298 A | 4/1937 | White | |
| 2,228,623 A | 1/1941 | Ennis | |
| 2,317,238 A | 4/1943 | Mennecier | |
| 2,476,306 A * | 7/1949 | King | C04B 28/18 |
| | | | 106/674 |
| 2,867,172 A | 1/1959 | Hradeljoseph | |

(Continued)

FOREIGN PATENT DOCUMENTS

| | | | | |
|---|---|---|---|---|
| EP | 18870655 A1 | | 2/2008 | |
| KR | 20020060053 | * | 7/2002 | ......... B28B 23/0087 |

*Primary Examiner* — Shuangyi Abu Ali
(74) *Attorney, Agent, or Firm* — Morriss O'Bryant Compagni, PC

(57) ABSTRACT

An apparatus, method and insulation medium for inserting and insulating a charge medium within a borehole includes a charge tube comprised of an elongate tube having a length and diameter sufficient for containing a desired quantity of a charge medium. A charge medium in a pumpable form is provided for substantially filling the charge tube. An insulation medium in a pumpable form is provided for substantially encapsulating the charge tube and substantially filling an annular space between the charge tube and the borehole for insulating the charge tube from a downhole environment in which the charge tube is to be inserted. A detonator is inserted within the charge medium proximate a distal end of the charge tube and a charge cable extends from the detonator through the charge tube and exits from the charge tube.

16 Claims, 14 Drawing Sheets

(56) References Cited

U.S. PATENT DOCUMENTS

| | | |
|---|---|---|
| 2,892,405 A | 6/1959 | Chesnut |
| 3,303,738 A | 2/1967 | Clay et al. |
| 3,447,978 A | 6/1969 | Bluhm |
| 3,696,703 A | 10/1972 | Fox |
| 3,718,088 A | 2/1973 | Bearden |
| 3,877,373 A | 4/1975 | Bergmann et al. |
| 4,074,629 A | 2/1978 | Colgate |
| 4,102,240 A | 7/1978 | Cook et al. |
| 4,160,412 A | 7/1979 | Snyer et al. |
| 4,273,147 A | 6/1981 | Olney |
| 4,508,035 A | 4/1985 | Mashimo et al. |
| 4,615,752 A | 10/1986 | Miller |
| 4,774,888 A | 10/1988 | Jones et al. |
| 4,858,531 A | 8/1989 | Lindstadt et al. |
| 4,872,507 A | 10/1989 | Ronco, Sr. et al. |
| 4,931,110 A | 6/1990 | McKenzie et al. |
| 5,007,345 A | 4/1991 | O'Garr |
| 5,132,624 A | 7/1992 | Kitson |
| 5,259,316 A | 11/1993 | Nelson et al. |
| 5,686,685 A | 11/1997 | McDonald et al. |
| 5,798,477 A | 8/1998 | Givens et al. |
| 6,397,719 B1 | 6/2002 | Vestre |
| 6,708,619 B2 | 3/2004 | Tota et al. |
| 6,722,251 B2 | 4/2004 | Keeling et al. |
| 2006/0063663 A1* | 3/2006 | Wolff .................... B01D 53/02 502/60 |
| 2011/0006585 A1 | 1/2011 | Holdcroft et al. |

\* cited by examiner

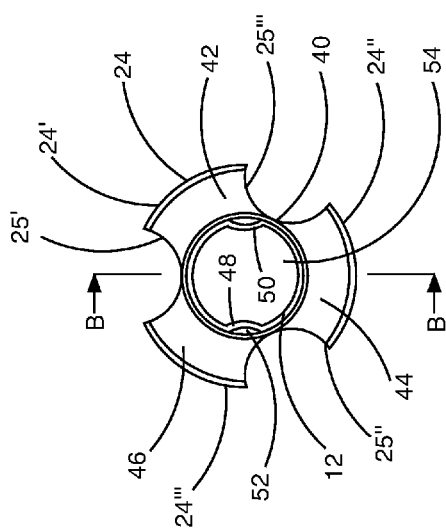
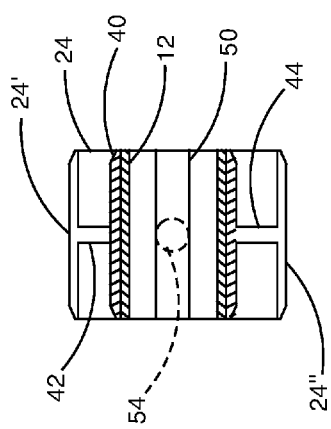
FIG. 3A
FIG. 3B
(SECTION B-B)

(SECTION A-A)

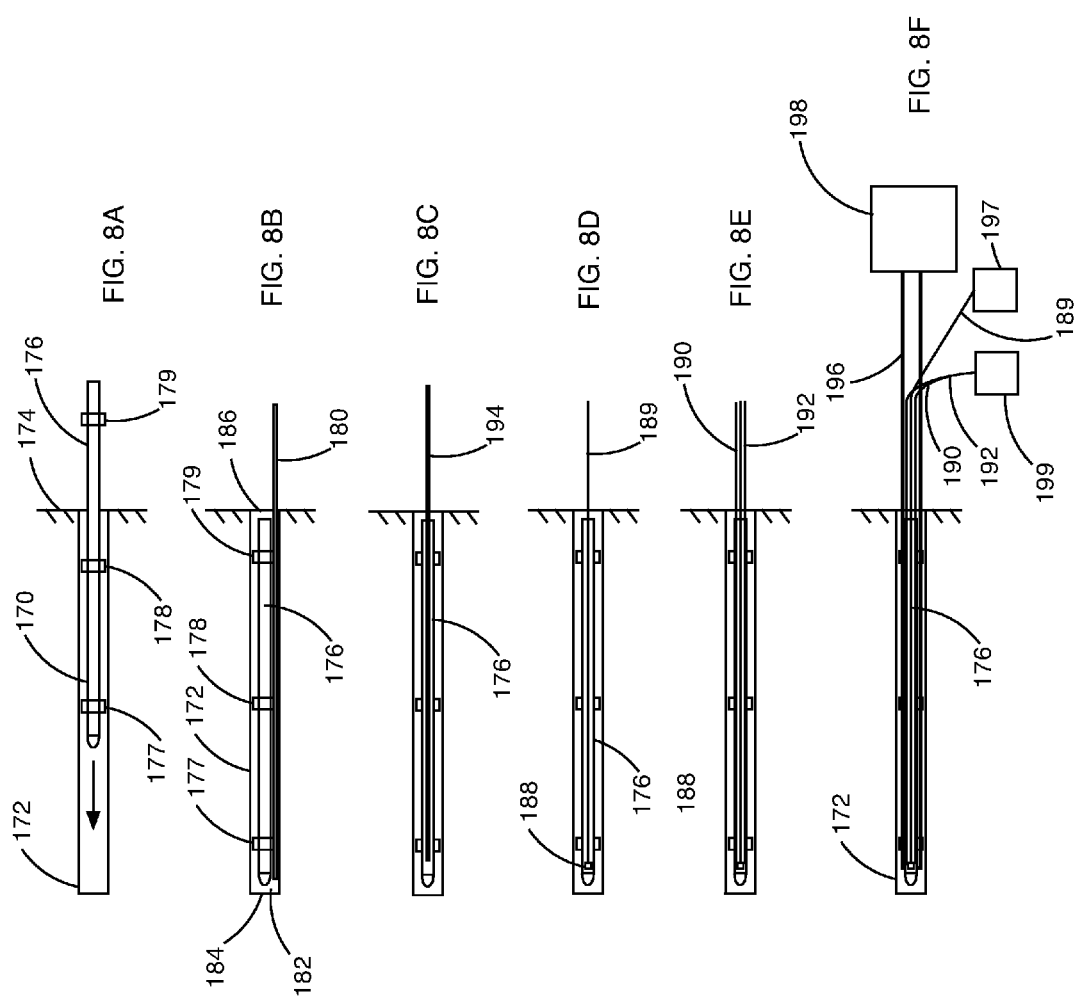

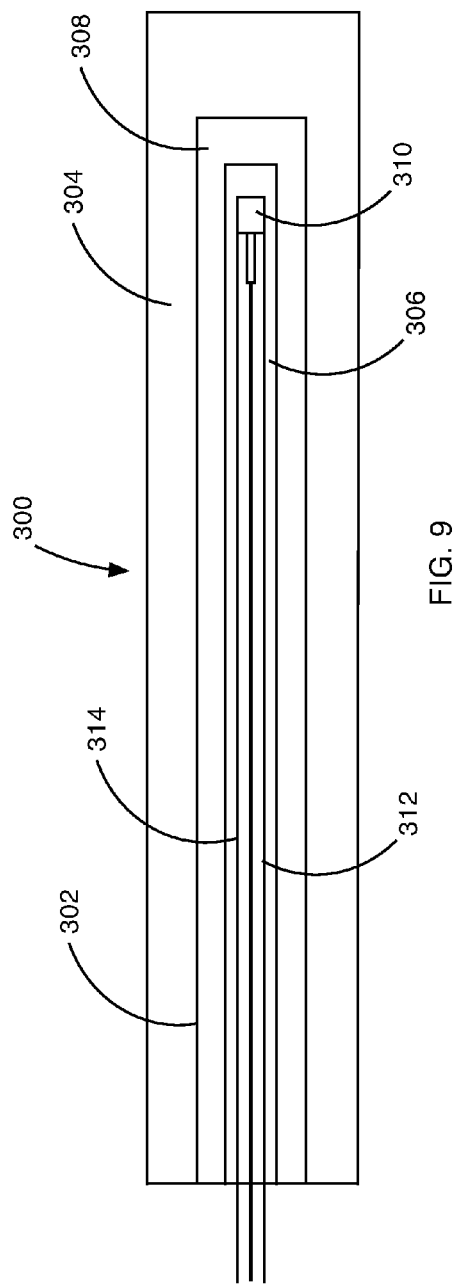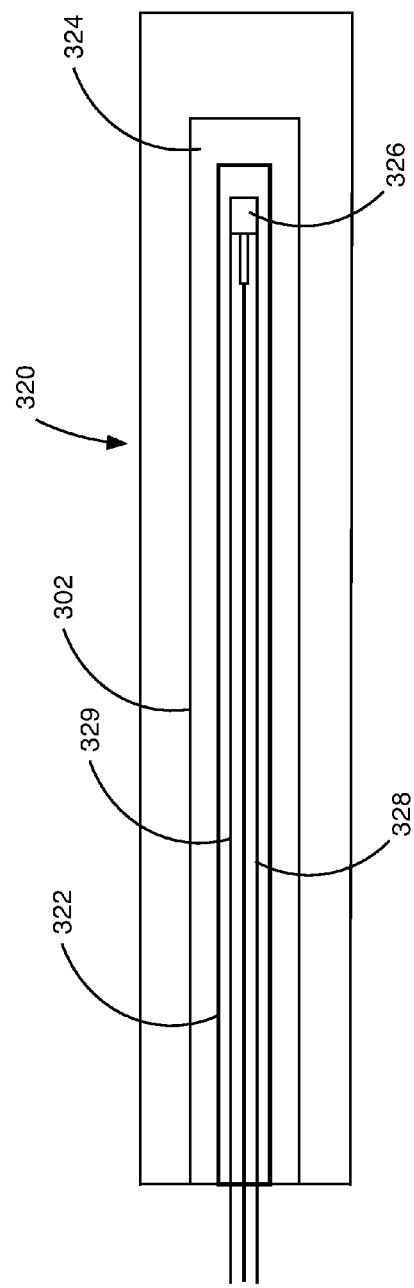

HOT HOLE CHARGE SYSTEM

CROSS-REFERENCE TO RELATED APPLICATION

This application is a continuation of U.S. patent application Ser. No. 13/425,078, filed on Mar. 20, 2012, now U.S. Pat. No. 8,820,242, the entirety of which is incorporated by reference.

BACKGROUND OF THE INVENTION

Field of the Invention

The present invention relates generally systems, methods and compositions for loading and detonating industrial explosives in a borehole and more specifically to systems, methods and compositions for loading and detonating explosives in the form of water gels, slurries and emulsions in boreholes where the boreholes have been formed in rock formations that are at elevated temperatures at or above the allowable exposure temperature for using such explosives in underground mining applications.

Description of the Related Art

The use of explosive compositions, including but not limited to water gels, slurries and emulsion-type explosives, in various types of blasting operations, including underground mining, has dramatically increased in recent years because of the economy and excellent explosive characteristics of such compositions. The advent of modern technologies in manufacture of explosives including emulsions has led to site-mixed slurry explosives. As the name suggests, such site-mixed slurry explosives are manufactured on site in a specially designed pump truck by carrying non-explosive ingredients in separate chambers, mixing them in specific proportions and pumping them in liquid form directly in to boreholes. The pumped mixture acquires the characteristics of an explosive within about ten minutes of pumping and solidifies slowly to the shape of the borehole. Unlike bulk emulsions, the site mixed slurry can be pumped in various densities ranging from 0.6 $g/cm^3$ to as high as 1.20 $g/cm^3$ and the energy can be varied to produce different types of chemically balanced explosive products to suit the rock conditions.

The slurry explosive generally has a high viscosity so that the slurry will not flow out of the borehole, fissures or joint gaps in the rock both during loading and thereafter prior to detonation. To be able to pump such high viscosity slurry explosives from the mix truck to the borehole, it is often necessary lubricate the interior of the loading pipe. For example, U.S. Pat. No. 4,273,147, the entirety of which is incorporated by this reference, a water film or water to which ammonium nitrate has been added is used to lubricate the loading pipe in order to allow the slurry explosive to be pumped through the loading pipe while maintaining safe pump pressures.

Any of the various known slurry explosives may be used in accordance with the present invention, including water-in-oil emulsions that are well known in the art. U.S. Pat. No. 4,931,110, the entirety of which is incorporated by this reference, discloses such an emulsive-type explosive material. Emulsive-type explosives usually contain an emulsifier such as a bis-alkanolamine or bis-polyol derivative of a bis-carboxylated or anhydride derivatized olefinic or vinyl addition polymer. Such emulsifiers impart improved stability and detonation properties to the explosive. Some emulsion-type explosives comprise a water-in-oil emulsion wherein the oil phase is a hydrocarbon fuel component and the dispersed aqueous phase is an aqueous solution of inorganic oxidizing salts. Various other materials, including sensitizing agents and additional fuels for example, can be employed in a variety of different formulations. Typical water-in-oil emulsion explosive compositions are set forth in detail in U.S. Pat. No. 3,447 to Bluhm, the entirety of which is incorporated by this reference.

ANFO (Ammonium Nitrate-Fuel Oil) explosives are a common water-in-oil type explosive in which ammonium nitrate, being oxygen positive, is often used as oxygen supplier in addition to being an explosive base. Such ANFO explosives have a density of between about 1.07 to 1.31 g/cc. Depending on the mixture, some ANFO explosives have good water resistance (e.g. Emulsion/ANFO 100/0, 70/30, 60/40, 40/60, 35/65), while others have poor water resistance (e.g., Emulsion/ANFO 25/75, 20/80, 10/90). The temperature ranges of use for ANFO explosives ranges from about −4 degrees Fahrenheit to about 122 degrees Fahrenheit.

It is also the case that explosive producers have begun using gassed slurries. These gassed slurries may be mixed with micro balloons or other porous additives. Likewise, gassed slurries may be formed by chemically gassing the slurry by adding a gassing agent to the slurry mix prior to being pumped to the borehole location or by adding a gassing agent at the end of the loading pipe just before entering the borehole.

Since pumping emulsion explosives involves the input of dynamic or kinetic energy into the explosive, attendant safety concerns are present. In addition to the potentially high operating pressure required for the pump, a pump running against a dead head can add considerable energy to the emulsion explosive being pumped, and could result in an unwanted detonation. In addition, if the pump is run "dry" such that no emulsion explosive is being pumped, any residual product also may experience considerable energy input to the extent that it may overheat and self-detonate. Thus, sophisticated pump monitoring and shut-down systems have been designed and implemented in various emulsion explosives pumping applications.

To address some of these concerns, various systems have been developed whereby emulsion explosives can be extruded pneumatically at a relatively low pressure from a pressurized vessel through an outlet and delivery hose. The addition of a water injection system provides an annular stream of water around the extruded emulsion explosive to lubricate its passage through the delivery hose. The use of a water injection system in the delivery of an emulsion explosive through a delivery hose is set forth in U.S. Pat. Nos. 4,273,147 and 4,615,752, the entirety of each of which is incorporated by this reference. Such water injection systems help reduce the pumping pressure requirements of a pump system, provided the water annulus is maintained. The combination of a pneumatically operated pressurized vessel for extruding the emulsion explosive and a water injection system for lubricating the flow of the emulsion is set forth in U.S. Pat. No. 5,686,685, the entirety of which is incorporated by this reference.

The use and the conditions for such use of all slurry explosives in the United States are federally regulated. 30 CFR §57.6905 sets forth the requirements for protecting such explosive material from extreme temperatures. Specifically, Section 57.6905(a) states, "Explosive material shall be protected from temperatures in excess of 150 degrees Fahrenheit." This temperature threshold was based upon the 1992 Bureau of Mines Information Circular No. 9335, Blasting Hazards of Gold Mining in Sulfide-Bearing Ore Bodies; MSHA's Investigation Report No. D7431-S949, Investigation of Premature Detonations, Paradise Peak Mine, (Dec. 10, 1991); and the IME Safety Library Publication No. 4, "Warnings and Instructions for Consumers in Transporting, Storing, Handling and Using Explosive Materials," (March 1992), all of which suggest a hazardous change in stability of explosives once temperatures reach this level.

Thus, whether or not a specific explosive material is capable of use in conditions that are above 150 degrees Fahrenheit, Federal regulations prohibit such use. Moreover, some explosives, such as certain ANFO explosives may be rated for use at temperatures below 150 degrees Fahrenheit. Thus, the user of such explosives not only needs to be certain that conditions of use of such explosives does not exceed federal guidelines, but that such conditions do not exceed the limits of the product as well.

The causes of elevated temperatures in underground mining can be due to geothermal heating (e.g., volcanic activity), geothermal gradients, burning coal seams, and sulphide oxidation that creates reactive ground conditions. In deep mining, rock face temperatures increase with the depth of the mine. Typically, the rock face temperature will increase at least one degree Celsius for every 100 meters of depth.

Because of the depth required to reach certain precious metal deposits, for example, the rock face temperatures can be at or above the allowed temperature limits of explosive materials. For example, platinum is exceedingly difficult to mine and extract and rock face temperatures can be well above the 150 degree Fahrenheit limit usually allowed for use of explosives. In Northam Platinum's Zondereinde mine in South Africa, rock face temperatures get as high as 162 degrees Fahrenheit and its shafts extend as far as 1.4 miles below the Earth's surface.

In addition, rock face environments may contain sulphides that through oxidation can form a reactive ground condition in which the explosive material can inadvertently detonate. The term "reactive ground" refers to rock that undergoes a spontaneous exothermic reaction after it comes into contact with nitrates. Such reactions involve the chemical oxidation of sulphides (usually of iron or copper) by nitrates. The resulting reaction can cause the liberation of potentially large amounts of heat. Thus, even in conditions where rock face temperatures are believed to be below the threshold temperature limit for explosives, chemical reactions within the formation can cause localized hot spots within the formation that exceed the allowable temperature. Because of the unpredictable nature of such chemical reactions, dangerous conditions may exist without being detected and can results in premature detonation of explosives.

Thus, there exists a need in the art to provide devices, compositions and methods for using such devices and compositions that allow use of explosives in underground mining where rock face temperatures are at or exceed 150 degrees Fahrenheit. There also exists a need in the art to provide devices, compositions and methods for using such devices and compositions that allow use of explosives in underground mining where reactive ground conditions exist. There further exists a need in the art to provide devices, compositions and methods for using such devices and compositions that are easy to use with existing explosives equipment that is easy and safe to use in underground mining where rock face temperatures are at or above 150 degrees Fahrenheit and/or where reactive ground conditions exist.

SUMMARY OF THE INVENTION

Accordingly, the present invention relates to systems, methods and compositions used with commercial explosive materials and systems and methods for delivering such commercial explosive materials into a borehole. The systems, methods and compositions of the present invention can be used with any commercial explosive material in a pumpable form for delivery into a borehole, whether by pneumatic extrusion, compressed air, plunger systems, worm gear or screw systems or other methods known in the art. Such pumpable forms of explosives may include gels, emulsions or slurries.

The system includes an elongate tube that forms a charge housing within which is disposed the detonator charge, charge cable and charge or explosive material in the form of a gel, slurry or emulsion explosive that is pumped into the charge housing. A plurality of charge housing supports are disposed on an outer surface of the charge housing for substantially concentrically aligning the charge housing within a borehole.

A pumpable thermal insulator is disposed around the charge housing once the charge housing has been inserted into the borehole. The pumpable thermal insulator substantially fully encapsulates the charge housing. The thermal insulator is capable of insulating the charge housing from the surrounding rock formation in order to keep the explosive material within the charge housing at a temperature that is below the maximum exposure limit of the explosive.

The thermal insulator is formed from a material that can neutralize any sulfides present within the borehole so as to prevent limit the effect of any reactive ground conditions that may be present within the borehole.

By substantially fully encapsulating the charge housing and substantially fully filling the annular space between the outer surface of the charge housing and the borehole, the thermal insulator also becomes a shock propagator that fully transmits the force of the blast of the explosive material once detonated into the surrounding rock formation in order to maximize the effect of the blast.

In one embodiment, a thermocouple wire extends along an inside surface of the charge housing so that the temperature of the explosive material within the charge housing can be continuously monitored.

In another embodiment, a cooling tube extends a substantial length along the outside of the charge housing. The cooling tube is filled with a cooling medium that may be in the form of a liquid or gas that is circulated through the cooling tubing to reduce the temperature of the thermal insulator and the charge housing. The cooling tube forms a complete loop within the borehole so that the cooling medium can be circulated through the cooling tube from outside the borehole.

In use, once a borehole has been drilled, the charge housing is inserted within the borehole. The thermal insulator medium is then pumped between the charge housing the borehole, substantially encapsulating the charge housing. The thermal insulator is pneumatically extruded or otherwise pumped from a pressurized vessel through an outlet extending from the vessel similar to that which is used for pumpable gel, emulsion or slurry explosives.

If extra cooling is needed due to mine condition, the cooling medium is pumped through the cooling tubing. The cooling medium may comprise liquid nitrogen that is circulated through a liquid nitrogen heat exchanger.

The liquid explosive in gel, emulsion or slurry form is pumped into the charge housing existing pump technologies.

The explosive is pumped from a pressurized vessel through an outlet extending from the vessel.

The detonator with the detonator cable is loaded into the charge. The thermocouple assembly is also inserted into the charge.

The borehole is then covered with a blast shield.

This process is repeated for other boreholes that have been drilled in the area for receiving explosives.

Thus, the present invention provides systems, methods and compositions that allow use of explosives in underground mining where rock face temperatures are at or exceed 150 degrees Fahrenheit. The present invention also provides systems, methods and compositions that allow use of explosives in underground mining where reactive ground conditions exist. The present invention further provides systems, methods and compositions that are easy to use with existing explosives equipment and that are easy and safe to use in underground mining where rock face temperatures are at or above 150 degrees Fahrenheit and where reactive ground conditions exist.

BRIEF DESCRIPTION OF THE DRAWINGS

When considered in connection with the following illustrative figures, a more complete understanding of the present invention may be derived by referring to the detailed description. In the figures, like reference numbers refer to like elements or acts throughout the figures.

FIG. 3A is an end view of a charge tube ring support in accordance with the principles of the present invention.

FIG. 3B is a cross-sectional side view of the charge tube ring support illustrated in FIG. 3A.

FIGS. 8A-8F are side view of a process for installing a hot hole charge system into a borehole in a rock face in accordance with the principles of the present invention.

FIG. 9 is a cross-sectional side view of another embodiment of a hot hole charge system in accordance with the principles of the present invention.

FIG. 10 is a cross-sectional side view of yet another embodiment of a hot hole charge system in accordance with the principles of the present invention.

Figure 1:
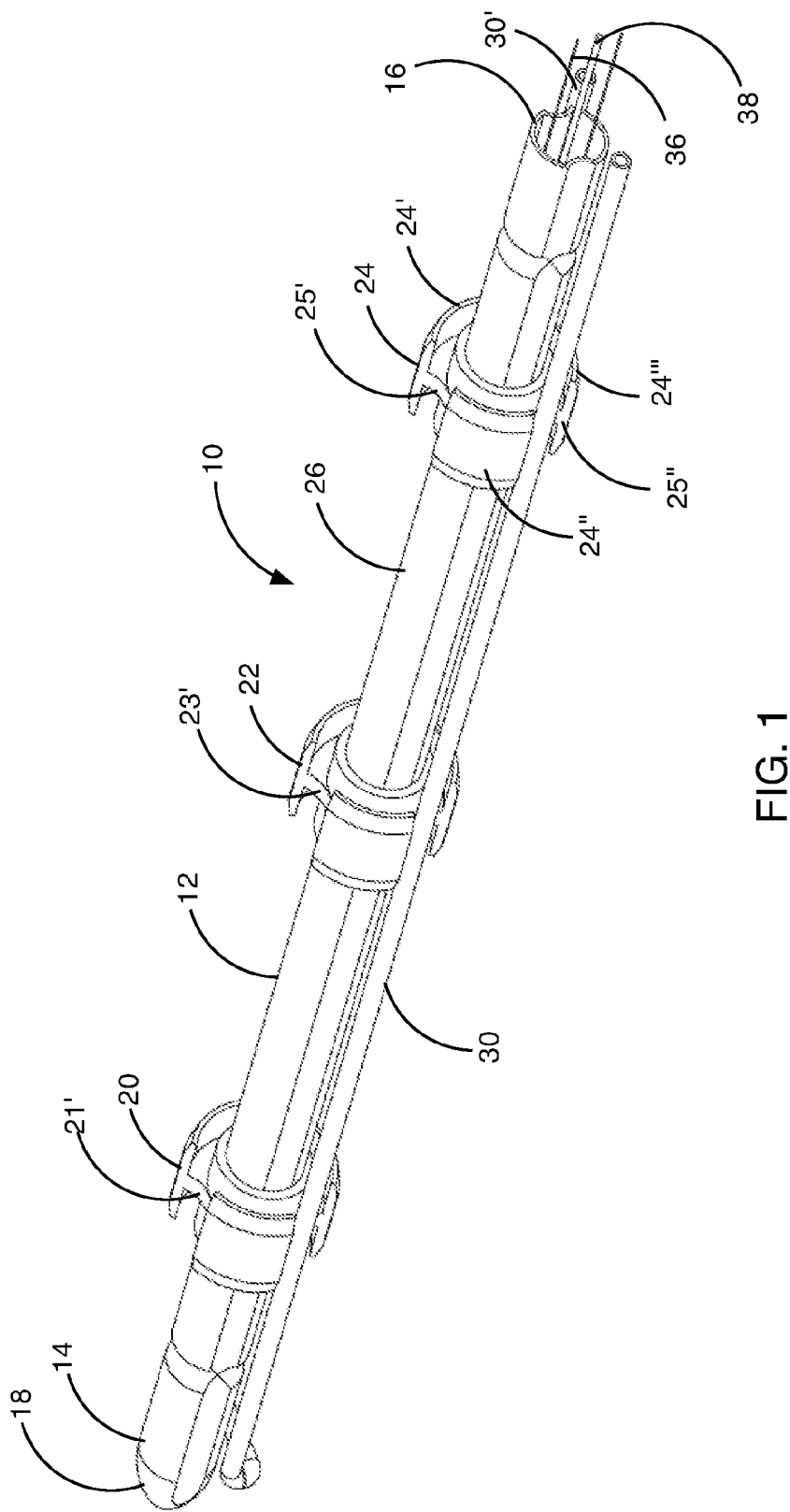
FIG. 1 is a perspective side view of a hot hole charge system in accordance with the principles of the present invention.

Elements and acts in the figures are illustrated for simplicity and have not necessarily been rendered according to any particular sequence or embodiment

DETAILED DESCRIPTION OF THE ILLUSTRATED EMBODIMENTS

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. It is noted that the inventor can be his own lexicographer. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, 116. Thus, the use of the words "function," "means" or "step" in the Detailed Description of the Invention or claims is not intended to somehow indicate a desire to invoke the special provisions of 35 U.S.C. §112, 116, to define the invention. To the contrary, if the provisions of 35 U.S.C. §112, 116 are sought to be invoked to define the inventions, the claims will specifically and expressly state the exact phrases "means for" or "step for" and the specific function (e.g., "means for filtering"), without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. §112, 116. Moreover, even if the provisions of 35 U.S.C. §112, 116 are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later developed, equivalent structures, material or acts for performing the claimed function.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Various aspects of the present invention may be described in terms of functional block components and various processing steps. Such functional blocks may be realized by any number of hardware or software components configured to perform the specified functions and achieve the various results.

Referring now to FIG. 1, there is illustrated a first embodiment of a hot hole charge system, generally indicated at 10, in accordance with the present invention. The hot hole charge system 10 is comprised of an elongate housing or charge tube 12 generally in the form of an elongate tube having a distal end 14 and a proximal end 16. The distal end of the charge tube 12 is fitted with a conically shaped end member 18 that is provided to help guide the distal end 14 of the charge tube 12 through a borehole (not illustrated) within which the hot hole charge system 10 is inserted. The charge tube 12 is formed from a material that is impervious to external water, minerals and chemicals that may be present in a downhole environment so as to isolate the explosive charge and detonator system from such water, minerals and chemicals.

A plurality of spaced apart charge tube supports 20, 22 and 24 are provided on the exterior surface 26 of the charge tube 12 to substantially concentrically align the charge tube 12 within a borehole. Each support 20, 22 and 24 defines an outer diameter that is slightly less than the diameter of the borehole within the hot hole charge system 10 is inserted and causes an annular space to be formed around the charge tube 12 between the charge tube 12 and the wall of the borehole. The supports 20, 22 and 24 are each provided with outer perimeter walls, such as walls 24', 24" and 24"' of support 24, that define an effective diameter of the support. Interposed between the walls 24', 24" and 24"' are longitudinally extending recesses, such as recesses 25' and 25". The recess 25" is provided for receiving therein and supporting a longitudinally extending cooling tube 30. Similar recesses are provided on the opposite side of the supports 20, 22 and 24 for receiving the return line 30' of the cooling tube 30. The recess 25' and corresponding recesses 21' and 23' are longitudinally aligned and are provided for allowing insertion of a thermal insulator pump nozzle (not shown) between the charge tube and the wall of the borehole. The process by which the borehole is filled with the thermal insulation medium will be described in more detail herein. The thermocouple 36 and detonator cable 38 are disposed within the charge tube 12.

In one embodiment, the charge tube 12 and associated supports 20, 22 and 24 are formed from polyurethane, which has good chemical resistant properties, especially in wet and/or corrosive environments as may be experienced in a rock face in an underground mine. In addition, by using a material such as polyurethane or other similar plastic-type materials known in the art, the tubing and support material changes to a gas form during detonation of the explosive charge so as to prevent the creation of shrapnel from the borehole upon detonation. It is further noted that polyurethane is non-toxic when it is turned into a gas, which is important in underground mining where miners are exposed to the byproducts of the explosion.

Figure 2:
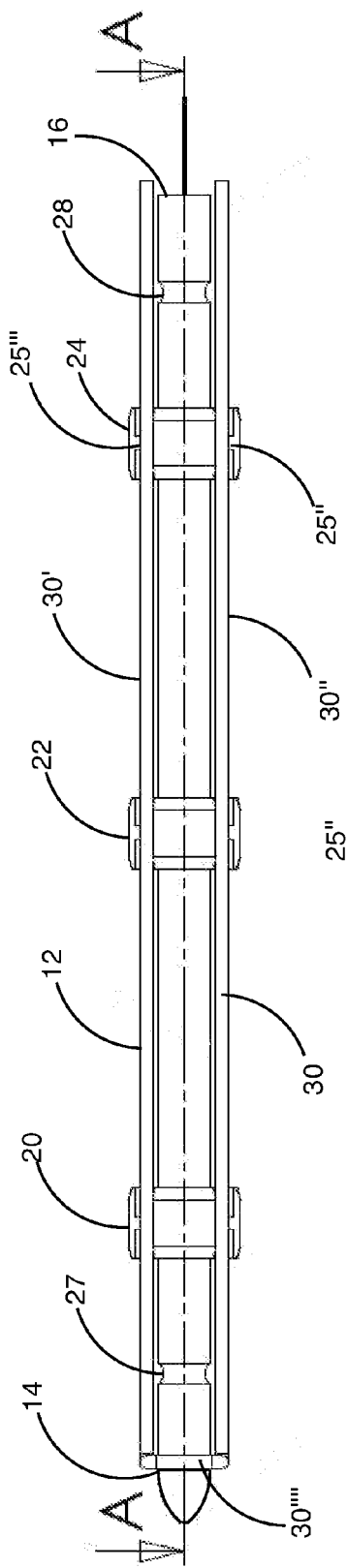
FIG. 2 is a side view of the hot hole charge system illustrated in FIG. 1.

As further illustrated in FIG. 2, each of the supports 20, 22 and 24 are approximately evenly spaced along the charge tube 12, with the support 20 toward the distal end 14 of the charge tube 12, the support 22 proximate a midpoint of the charge tube 12 and support 24 toward the proximal end 16 of the charge tube 12. Each support 20, 22 and 24 includes a pair of arcuate-shaped, longitudinally extending recesses, such as recesses 25" and 25"' of support 24, with the recess 25" configured for receiving and retaining relative to the charge tube 12 a feed line 30" of the cooling line 30 and the recess 25"' configured for receiving and retaining relative to the charge tube 12 a return line 30' of the cooling line 30.

As further illustrated in FIGS. 3A and 3B, each sleeve, such as sleeve 24 includes a central sleeve portion 40 sized to receive the charge tube 12 therein. The sleeve 24 may be friction fit to the charge tube 12 so as to retain its position relative to the charge tube 12 as the charge tube 12 is inserted into a borehole. The sleeve 24 further includes a plurality of radial extending walls 42, 44 and 46 from which longitudinally extending arcuate walls 24', 24" and 24"' depend, respectively. The walls 24', 24" and 24"' each have front and rear tapered edges for ease of insertion and retraction from the borehole. By having each of the walls 24', 24" and 24"' radially spaced from the central sleeve portion 40, the charge tube 12 is concentrically maintained relative to the walls 24', 24" and 24". Thus, by making the effective diameter of the walls 24', 24" and 24"' slightly less than a diameter of a borehole, when the sleeve 24 and charge tube 12 are inserted in the borehole, the charge tube 12 will be approximately concentrically centered within the borehole.

A plurality of recesses or channels 25', 25" and 25"' are defined by the radial extending walls 42, 44 and 46 and walls 24', 24" and 24". The recesses 25" and 25"' are configured for receiving the cooling tubing previously described herein, while the recess 25' is provided for insertion and retraction of a thermal insulator nozzle that, as will be described in more detail herein, can be inserted the length of the charge tube 12 when the charge tube 12 is fully inserted into the borehole an subsequently retracted as a thermal insulation medium is deposited within the borehole between the wall of the borehole and the outside surface of the charge tube 12 as the nozzle is retracted from the borehole through the recess 25'.

In order to provide proper alignment between the corresponding channels or recesses of the sleeves, the charge tube 12 is provided with one or more longitudinally extending channels 48 and 50. Corresponding protrusions 52 and 54 are formed on the inside surface of the central sleeve portion 40 that engage with the channels 48 and 50 to prevent rotation of the annular support ring 24 relative to the tube 12. With each such support ring 24 similarly configured and aligned relative to the charge tube 12, the respective outer channels of each support will be longitudinally aligned along the length of the charge tube 12. The support rings are may be fastened to the charge tube 12 by threading, mating, snap features, adhesive bonding, ultrasonic welding, friction fit or any combination thereof.

As shown in FIG. 2, the charge tube 12 also includes radially extending recesses 27 and 28, one near the distal end 14 and one near the distal end 16. The radial recesses 27 and 28 in combination with the longitudinally extending recesses 48 and 50 (see FIG. 3A) provide at least two functions. When the supports are not permanently attached to the charge tube 12, the recesses allow for the supports 20 and 24, respectively to be slid along the charge tube 12 until the protrusions thereof reach a radial recess at which point the supports 20 and 24 can be rotated relative to the charge tube 12 without requiring removal from the charge tube 12. In addition, when the detonator charge and thermocouple are inserted into the charge tube 12, the areas of reduced diameter that are formed inside the charge tube 12 as a result of the exterior recesses or channels, cause the detonator charge to be generally centrally located within the charge tube when placed therein an cause the thermocouple to be slightly embedded in the explosive medium so as to provide a temperature reading of the charge medium rather than the just the surface temperature of the charge tubing 12. Thus, as will be describe in more detail with reference to FIG. 4, the radial recesses, 27 and 28 and longitudinal recesses 48 and 50 provide areas of reduced diameter within the charge tube 12. When the detonator charge, which has a diameter that is less than the inside diameter of the charge tube 12, is positioned on the downhole side of the area of reduced diameter of the charge tube 12, the detonator charge 12 will be generally centrally located within the charge tube 12.

As further shown in FIG. 2, the cooling line 30 further includes a cross line 30'''' positioned proximate the distal end 14 of the charge tube 12 that is in fluid communication with and interconnects the feed line 30'' and return line 30' of the cooling tube 30. Thus, the feed line 30'' and return line 30' longitudinally extend along the sides of the charge tube 12, with the feed line 30'' positioned on one side of the charge tube 12 and the return line 30' positioned on an opposite side of the charge tube. As such, a coolant, such as liquid nitrogen or other liquid or gaseous coolant mediums, can be circulated through the cooling tube 30 from outside the borehole in order to maintain a desired temperature of the charge tube 12 once inserted into a borehole, or at least prevent the temperature of the charge tube 12 from exceeding a threshold temperature limit, such as 150 degrees Fahrenheit that would otherwise prevent, through regulation, use of an explosive material in an environment where the temperatures are at or above the allowable temperature limit. Depending on the external conditions of the mine face at the location of the blast pattern, cooling of the pumpable insulator medium could be required. The cooling system can be cold enough to at least partially freeze the pumpable insulator medium if necessary so as to maintain a desired temperature of the charge medium.

Figure 4:
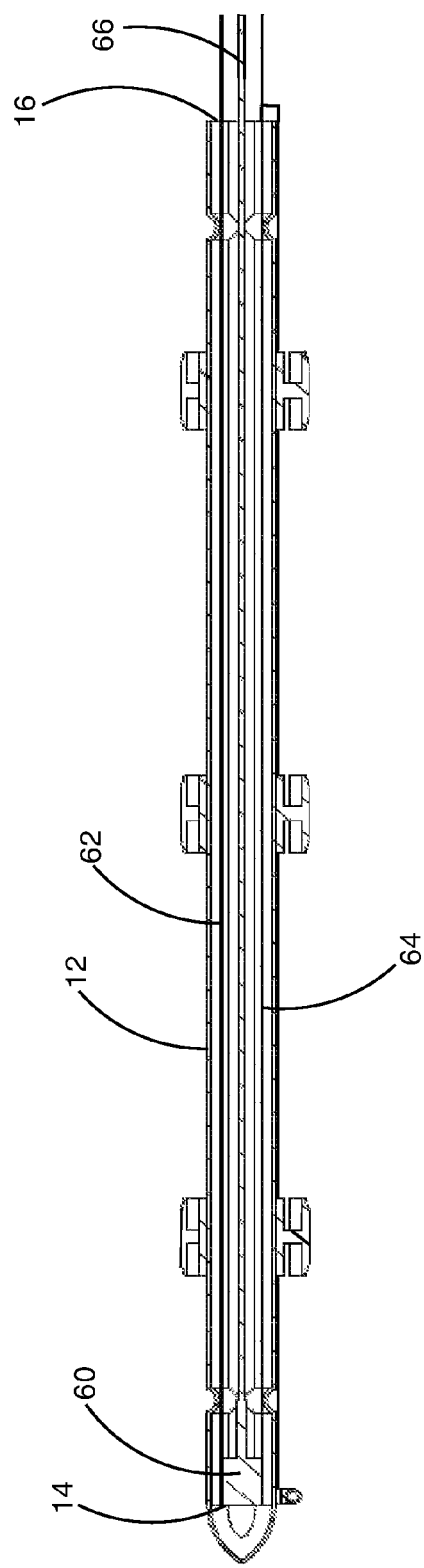
FIG. 4 is a cross-sectional side view of the hot hole charge system illustrated in FIGS. 1 and 2 further containing a charge, detonator and thermocouple in accordance with the principles of the present invention.

As illustrated in FIG. 4, a detonator charge 60 is positioned within the charge tube 12 proximate the distal end 14 of the charge tube 12. In addition, thermocouple elements 62 and 64 having leads that extend from the proximal end 16 of the charge tube 12 are inserted into the charge tube 12 so as to provide the temperature of the explosive medium at various locations along the charge tube 12. That is, the thermocouples 62 and 64 can be configured to measure temperatures along the entire charge tube 12 or at discrete locations along the charge tube with the highest such temperature being detected through each thermocouple 62 and 64 being measured and used to activate and/or control the cooling system. The detonator cable 66 is coupled to the detonator charge 60 and extends out through the proximal end 16 of the charge tube 12. The detonator cable 66 is connected to detonation equipment as is known in the art.

Figure 5:
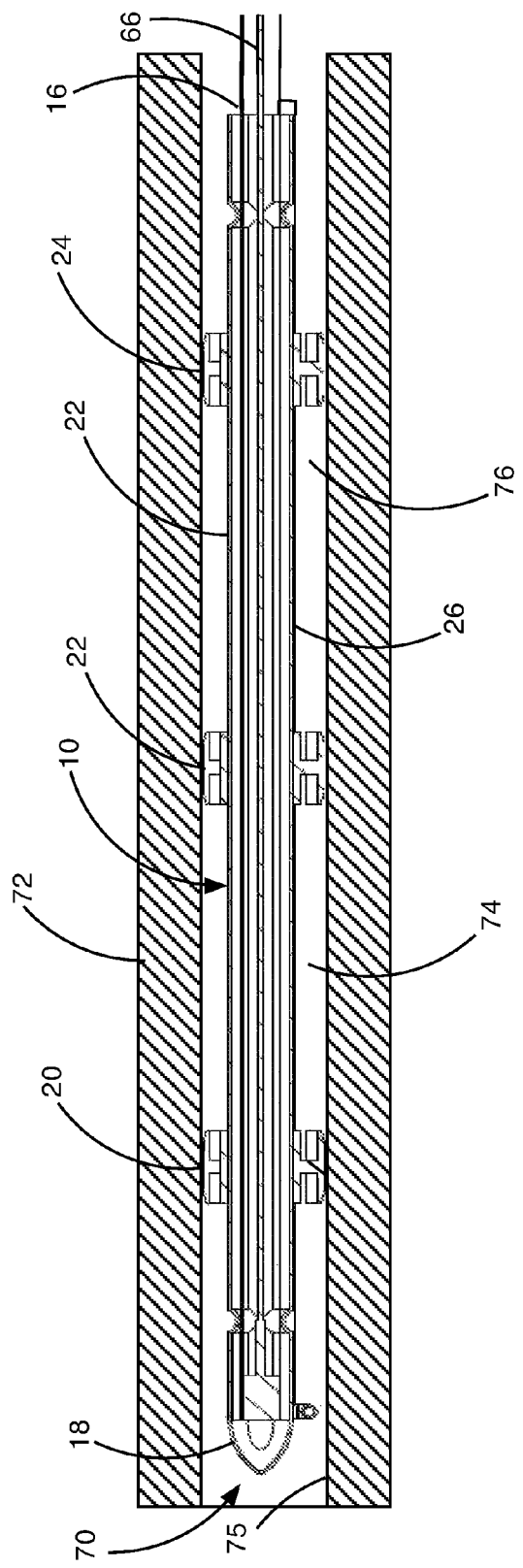
FIG. 5 is a cross-sectional side view of the hot hole charge system illustrated in FIG. 1 in a downhole location in accordance with the principles of the present invention.

Referring now to FIG. 5, there is illustrated the hot hole charge system 10 in accordance with the principles of the present invention inserted into a borehole 70 that has been pre-drilled into a rock face 72. The support rings 20, 22 and 24 substantially concentrically align the charge tube 12 within the borehole 70. The nose cone 18 helps to guide the hot hole charge system through the borehole 70 as it is inserted. Once the hot hole charge system 10 is inserted into the borehole 70 as shown in FIG. 5, an insulating medium 74 is dispensed and deposited within the borehole 70 between the wall 75 of the borehole 70 and the outside surface 26 of the charge tube 12. Essentially, the insulating medium 74 fully encapsulates the charge tube 12 by substantially completely filling the annular space 76 defined between the borehole wall 75 and the charge tube 12. The insulating medium 74 has various properties and characteristics that provide various beneficial features.

Figure 6A:
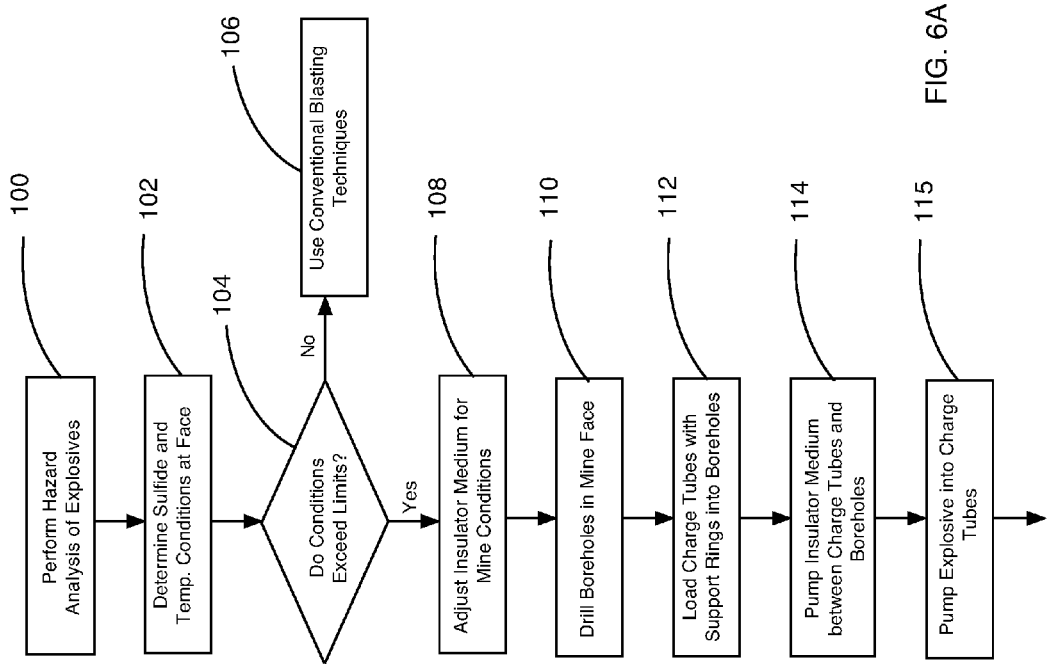
FIGS. 6A and 6B are schematic flow diagrams of a method of using a hot hole charge system in accordance with the principles of the present invention.
Figure 6B:
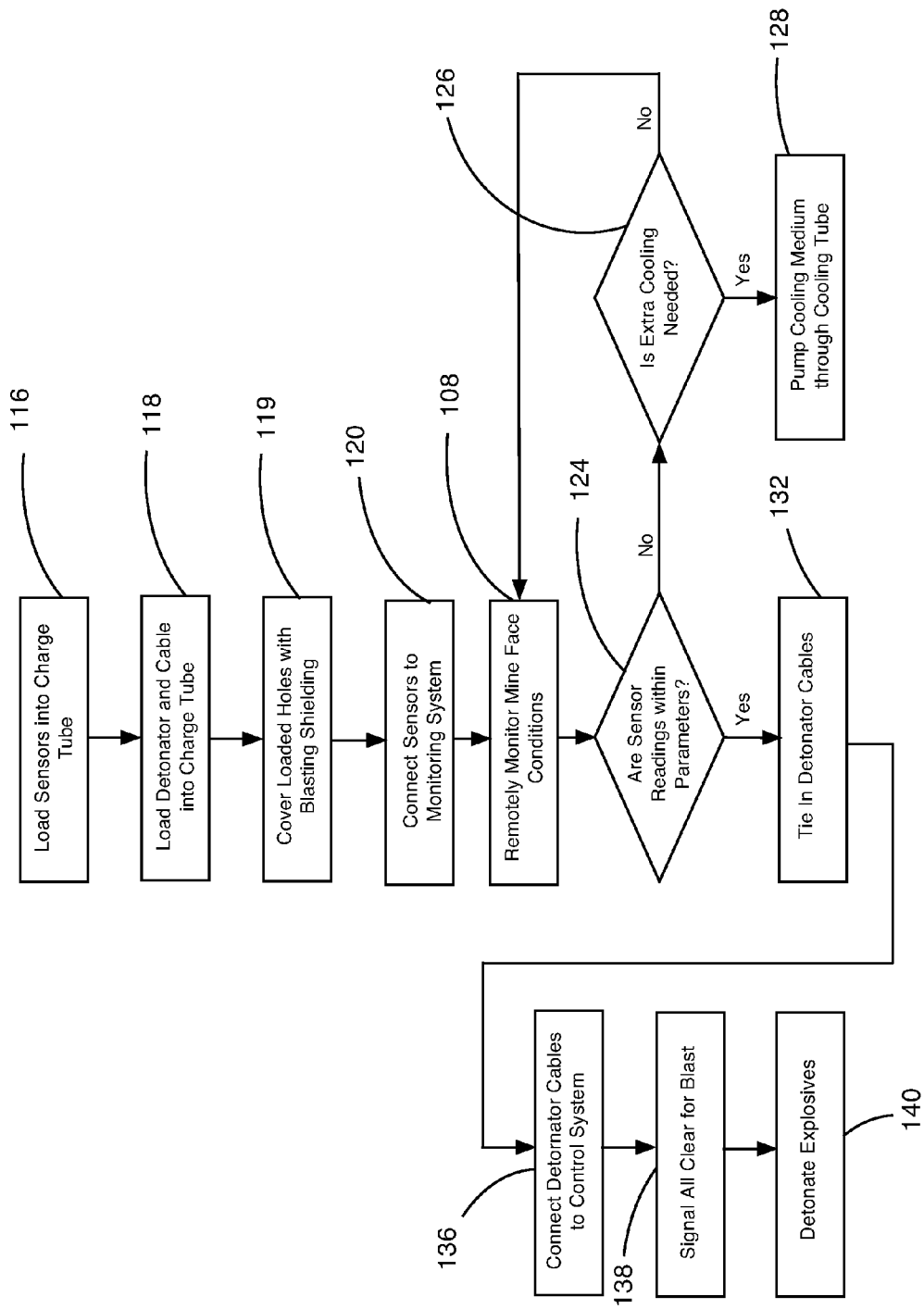

As has been discussed herein, a hot hole charge system according the to the principles of the present invention is designed and configured for blasting with the use of conventional liquefied forms of industrial explosives, including, but not limited to gels, slurries and emulsions, in mine rock faces where temperatures exceed about 150° F. and/or in environments where sulfide catalyst reactions can a occur that can detrimentally affect the performance and predictability characteristics of such industrial explosives. FIGS. 6A and 6B set forth a method for using a hot hole charge system of the present invention in underground mining conditions that are not conducive or allowed for use of conventional liquefied forms of industrial explosives. As set forth in FIG. 6A, a first step is to perform 100 a hazard analysis of the explosive material being used to determine the operational limits of the particular explosive material and the particular vulnerability of the explosive material to heat exposure and/or sulfide dust reactions that are present at the particular mine site. This hazard analysis may thus include a test to determine the vulnerability of the explosive material to self detonate at an elevated ambient temperature and/or the effect that a lower pH level of an acidic environment will have on the particular explosive material. Such tests may be performed independently of any government regulations that prohibit use of such explosive materials in environments where the temperature is at or above a temperature limit (e.g., 150 degrees Fahrenheit in the United States). Thus, despite the particular government regulation that may be involved, the system can be configured to alter the environmental conditions surrounding the explosive material in situ in order to ensure that the explosive material is not exposed to temperatures or conditions that may affect the stability of the product as well as ensuring that the explosive material is not exposed to temperatures or conditions that exceed government limits, if they exist in the jurisdiction in which the particular explosive material is being used.

In addition to determining the operational limits of the particular explosive through testing of the particular explosive material, the conditions of the rock face within which the explosive material is to be used (i.e., the location of the blast pattern) is also determined 102. This involved inserting temperature and/or pH probe or sensor into a borehole that is drilled into the formation in the location in which the explosive material is to be loaded for blasting. In addition or in the alternative to using a pH probe or sensor, samples from the drilling fines can be taken and tested to determine the pH of the dust drilled from the borehole. It may be prudent to test several boreholes in the rock face to obtain a better sampling of rock face temperature and pH throughout the rock face. Once the borehole(s) temperature and pH are measured and determined, if the rock face conditions indicate that direct loading of the explosive material into the rock face may expose the explosive material to unfavorable conditions or conditions that will exceed allowable limits 104, the hot hole charge system of the present invention can be employed to allow the explosive material to be used in a borehole that would otherwise prohibit such use. If the rock face conditions do not exceed allowable limits, conventional blasting techniques can be used 106. If it is determined that the hot hole system of the present invention is required, the composition of the insulator medium as herein describe can be adjusted 108 to account for the particular mine conditions. For example, depending on the measured pH of the borehole environment, the pH of the insulator medium can be adjusted and buffer components added to essentially neutralize the pH of the borehole environment surrounding the charge tube of the present invention as previously described herein. In addition, if the rock face conditions are particularly wet, the density and/or viscosity of the insulator medium can be adjusted to account for such conditions by allowing for some absorption of water from the borehole. In general, a relatively high density insulation medium is used between the charge tube and mine rock to substantially completely encapsulate the explosive charge so as to provide good shock wave propagation between the explosive material and the walls of the borehole so as to cause essentially direct transmission of the force of the explosion into the rock face. Thus, the insulation medium provides full borehole coupling between the explosive material and the rock face so as to optimize the transfer of energy from the explosion into the rock.

Once it is determined that the hot hole system of the present invention is required, the various boreholes are drilled 110 into the mine face as per existing blasting protocols, as for example for depth and spacing, to form a blast pattern. With particular reference to depth, it is noted that the charge tube of the present invention is configured to have an overall length to be fully inserted within the drilled borehole. Because the quantity of explosive material present in the hot hole system of the present invention is less than what would completely fill the borehole if the borehole were to be directly filled with such explosive material, either the diameter of the borehole can be increased to allow a comparable amount of explosive material to be provided in each borehole, with the diameter of the charge tube approximately equaling the diameter of a borehole drilled for conventional liquefied explosive blasting techniques, or the blast pattern can be modified to adjust the spacing between adjacent boreholes so that the amount of explosive material per volume of rock face is approximately equal to the amount of explosive material using conventional blasting techniques.

Once a plurality of boreholes have been drilled having a diameter that is slightly greater than the diameter of the support rings of the charge tube of the present invention, a charge tube with support rings is loaded 112 into a first borehole. Once inserted, the specifically tailored insulator medium is pumped 114 into the borehole between the borehole and the charge tube to essentially encase the charge tube with the insulator medium. Subsequently, or simultaneously therewith, a charge medium in the form of a pumpable explosive is pumped 115 into the charge tube.

As illustrated in FIG. 6B, once the charge tube, insulator medium and charge medium have been loaded into each borehole, various sensors are loaded 116 into the charge tube. Likewise, the sensors could be inserted into the insulator medium to monitor temperature or pH of the insulator medium between the borehole and the charge tube. The sensors may include one or more thermocouples that will measure temperature within the charge tube to ensure that any explosive material placed therein will not be exposed to temperatures that will exceed any explosive limits. A detonator and detonator cable are also loaded 118 into each charge tube as with use of a non-conductive rod as is known in the art. The detonators may each comprise a RDX stinger (Comp B) detonator with a transition element. The boreholes are covered 119 with blasting shield as is known in the art. Thus, the mineworkers can be protected from the loaded holes with blast shielding. Blast shields made of bulletproof panels mounted on semi-automated hydraulic arms can be controlled remotely. The blast shielding will be attached to the explosive pump vehicle. As the operator finishes loading a series of explosive charges along the mine face, the blast shielding will be positioned between loaded holes and the operator. The operators will be wearing blast proof clothing, such as a blast suit PPE, similar to current bomb squad and military blast suits, with an internal operator cooling system. In the event of a singular charge hole prematurely detonating, the operator will be protected from fragmentation.

The sensors are connected 120 to a remote monitoring system that can be at or near the mine face to allow operators to monitor 122 borehole conditions and/or at some distance from the face to allow supervisors or other personnel to monitor mine face conditions in real-time during installation of all of the hot hole charge systems and prior to detonation. It is also contemplated that the monitoring of the mine face may include the use of a remote control mobile robotic camera to provide video of the mine face both during and after installation of the explosives. As such, the mine face can be recorded in real-time and be controlled from a safe location away from the blast zone. A camera system can be tied into the thermocouple and blast box system to be accessed simultaneously. A remote controlled mobile robotic platform equipped with sulfide dust detecting sensors, thermal sensors, and cameras can also be used to monitor the conditions of the mine face in real time.

If the sensor readings are determined 124 to be outside preset parameters and extra cooling is needed 126, a cooling medium is pumped 128 through the cooling tube of at least the hot hole charge system for which a temperature anomaly has been detected. For example, a liquid nitrogen heat exchanger system may be coupled to the cooling tube to provide a flow of liquid nitrogen through the cooling tube in order to provide cooling of the hot hole charge system as required.

Once all of the boreholes have been loaded with a charge tube, insulator medium, sensors, detonator and explosive material and blast shields have been put in place, the detonator cables are tied 132 together and connected 136 to a detonation control system. For example, the RDX stinger detonators are tied to a separate and isolated bunch block and conventional detonator via a leaky feeder control system. Thus, the thermocouple, real-time monitoring and blast control systems will all be inter tied and controlled safely from the blast face via a leaky feeder communication system. This line of sight connection system will consist of radio wave emitting and receiving coaxial cable laid along mine shaft. Once personnel have been cleared of the area and the all-clear signal has been given 138, the explosives can be detonated 140.

Figure 7A:
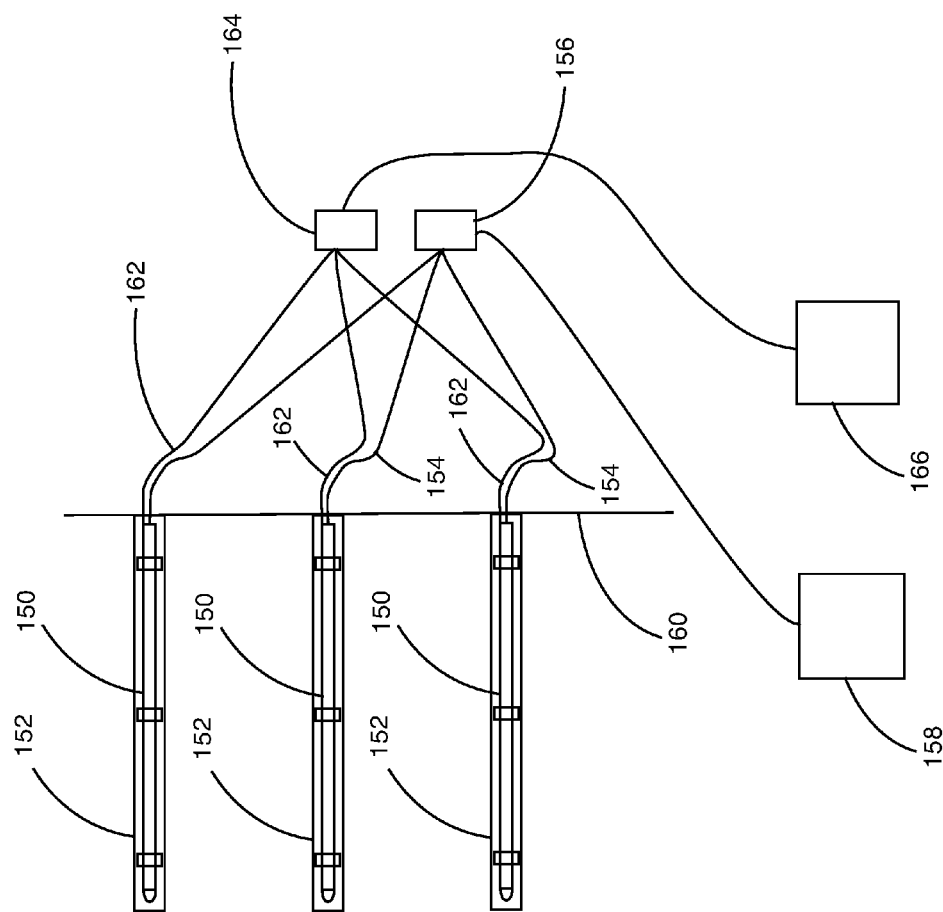
FIG. 7A is a side view of a plurality of hot hole charge system in accordance with the principles of the present invention inserted into a corresponding plurality of boreholes in a rock face.
Figure 7B:
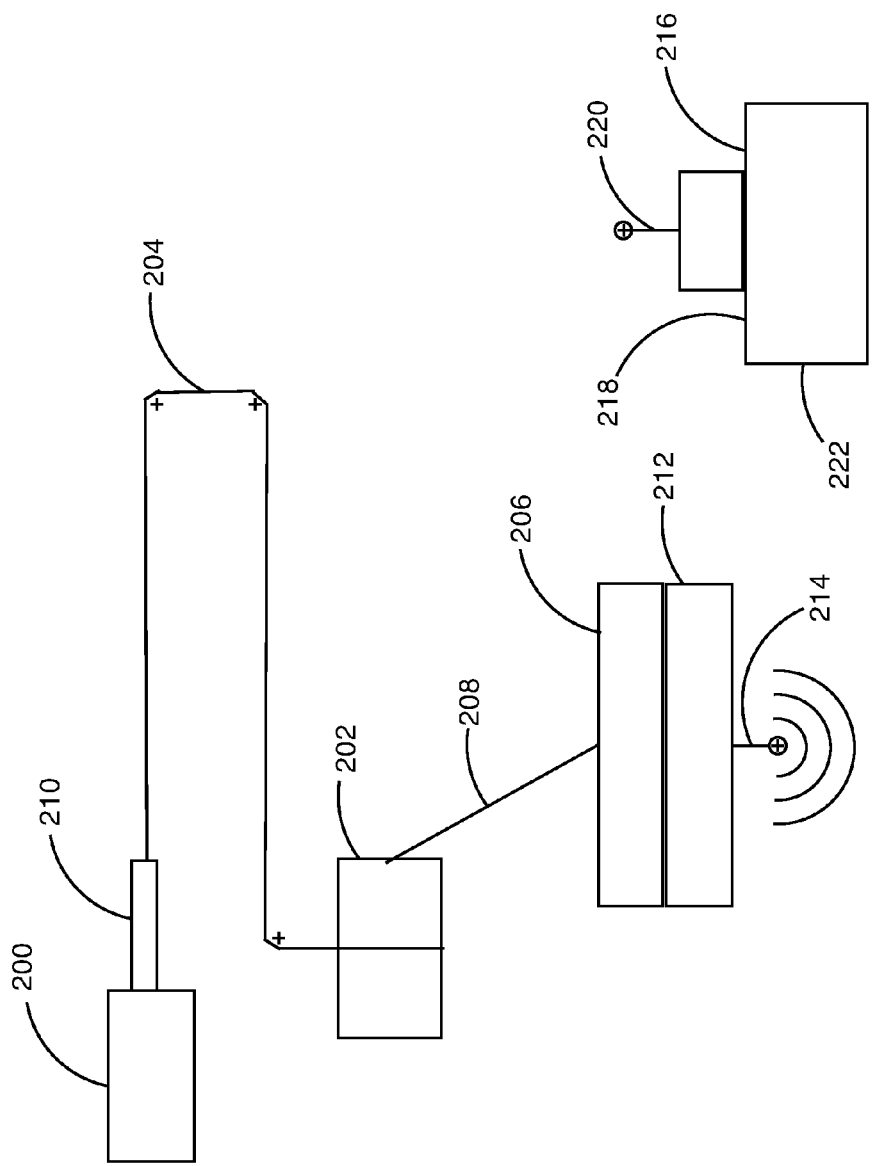
FIG. 7B is a schematic diagram of a detonation control system in accordance with the principles of the present invention.

FIG. 7A illustrates a plurality of hot hole charge systems 150 according to the principles of the present invention that have been loaded into a respective plurality of boreholes 152. Each of the plurality of hot hole charge systems 150 has a detonator cable 154 extending therefrom that is connected to a detonator coupling system 156. The coupling system 156 is subsequently coupled to a detonation control system that 158 that is located at a remote location at a safe distance from the rock face 160. The detonation control system 158 may comprise a RDX stinger detonator system designed to withstand high temperature environments. The bunch block will be tied into an isolated conventional blasting machine with RDX cord and a conventional detonator. As shown in FIG. 7B, The RDX stinger detonator system is designed to withstand high temperature environments. The Comp B detonator charge 200 will be tied into a bunch block 202 using 10 g RDX cord 204. The bunch block will be tied into an isolated conventional blasting machine 206 with RDX cord 208 and a conventional detonator. A T element 210 with RDX cord and lead aside fuse cap is coupled to the Comp B detonator charge 200. The bunch block 202 with the RDX detonator lead can be used to tie in multiple charges. The blasting machine 206 includes a radio transmitter/receiver 212 that includes an antenna 214 capable of transmitting sensor data and receiving information for blasting. A remote monitoring station 216 includes a transmitter and receiver 218 for receiving sensor data from the blast site and can transmit the blast signal through the antenna 220. The remote monitoring station 216 includes a monitor 222 for monitoring the sensor data and viewing video images from the remote camera at the blast site.

Likewise, each of the plurality of hot hole charge systems 150 have a sensor cable 162 extending therefrom that is connected to a sensor coupling system 164. The sensor coupling system is subsequently coupled to a sensor monitoring system 166 that may be located at a remote location at a safe distance from the rock face 160.

FIGS. 8A-8F further illustrate the installation of a hot hole charge system 170 in according with the principles of the present invention. Once an appropriate borehole 172 of sufficient length and diameter has been drilled into a rock face 174, the charge tube 176 and ring supports 177-179 of the hot hole system are inserted into the borehole 172. Once fully inserted, as shown in FIG. 8B, an insulation medium pumping wand 180 is inserted into the borehole 172 between the borehole 172 and the charge tube 176, thus extending through each of the supports 177-179. The wand 180 is withdrawn from the borehole 172 as the insulation medium 182 is pumped into the borehole 172 through the wand 180. As such, the borehole 172 is filled from the distal end 184 toward the proximal end 186 to substantially completely fill the annular space between the borehole 172 and the charge tube 176 so as to substantially encapsulate the charge tube 176 with the insulation medium.

As further illustrated in FIG. 8C, a wand 194 for depositing the explosive material is inserted into the charge tube 176 to proximate the distal end thereof and retracted from the charge tube 176 as the explosive material is pumped into the charge tube 176. This ensures that the entire length of the charge tube is completely filled with explosive material without any significant air pockets.

As shown in FIG. 8C, the detonator 188 and detonator cable 189 are inserted into the charge tube 176. Likewise, as shown in FIG. 8E, the thermocouple 190 and pH sensor 192 are inserted into the charge tube 176. Conversely or in addition to, a thermocouple and pH sensor could be inserted into the annular space between the charge tube 175 and the borehole 172 to measure temperature and/or pH of the surrounding insulator medium.

As illustrated in FIG. 8F, in the case where additional cooling is required within the borehole 172, cooling tubing 196 is provided along side of the charge tube 176 so as to extend substantially the entire length thereof. The cooling tubing is coupled to a supply system 198 that may include an external liquid nitrogen tank to circulate a cooling medium, such as liquid nitrogen, through the cooling tubing 196 as may be required to properly cool the charge tube 176. The cooling tubing 196 thus runs along the exterior of the charge tube 176 to essentially form a heat exchanger for the charge tube 176 with inlet and outlet valves in the supply system to regulate the flow of cooling medium through the cooling tubing 196. Circulation of the liquid nitrogen through the cooling tubing will cause the insulation medium to at least partially freeze to cool the charge tubing 196. Alternatively, the supply system may include a refrigeration unit, isolated from the blast, circulating a cooling liquid.

The detonator cable 189 and sensor cables 190 and 92 are also coupled to respective external systems 197 and 199.

It is further contemplated that various features of the hot hole charge system of the present invention could be used without the charge tube system. As illustrated in FIG. 9, a hot hole charge system of the present invention, generally indicated at 300, may be installed in a borehole 302 that has been drilled into a rock face 304. The charge system 300 is comprised of an charge medium 306 encapsulated within an insulator medium 308. The insulator medium 308 and charge medium 306 may be simultaneously extruded into the borehole 302 from a nozzle attached to a pumping system. Once the borehole 302 is filled with the charge medium 306 and insulator medium 308, the detonator 310 and sensors 312 and 314, such as thermocouple and pH sensors, can be inserted. The detonator 310 is inserted toward the distal end of the charge medium 306 within the borehole 302. The sensors 312 and 314 can be inserted within the charge medium 306 or the insulator medium 308 at any location along the length of the borehole 302 depending on the location from which sensor readings are desired.

As further illustrated in FIG. 10, a hot hole system of the present invention, generally indicated at 320, may comprise a charge tube 322 that is comprised of a flexible plastic or polymer bag that can be filled with the charge material as the tube unfurls within the borehole. The insulator medium 324 can then be pumped around the tube 322 to fill the space between the tube 322 and the borehole 302. The detonator 326 can then be inserted into the tube 322 as well as the sensors 328 and 329.

Figure 11:
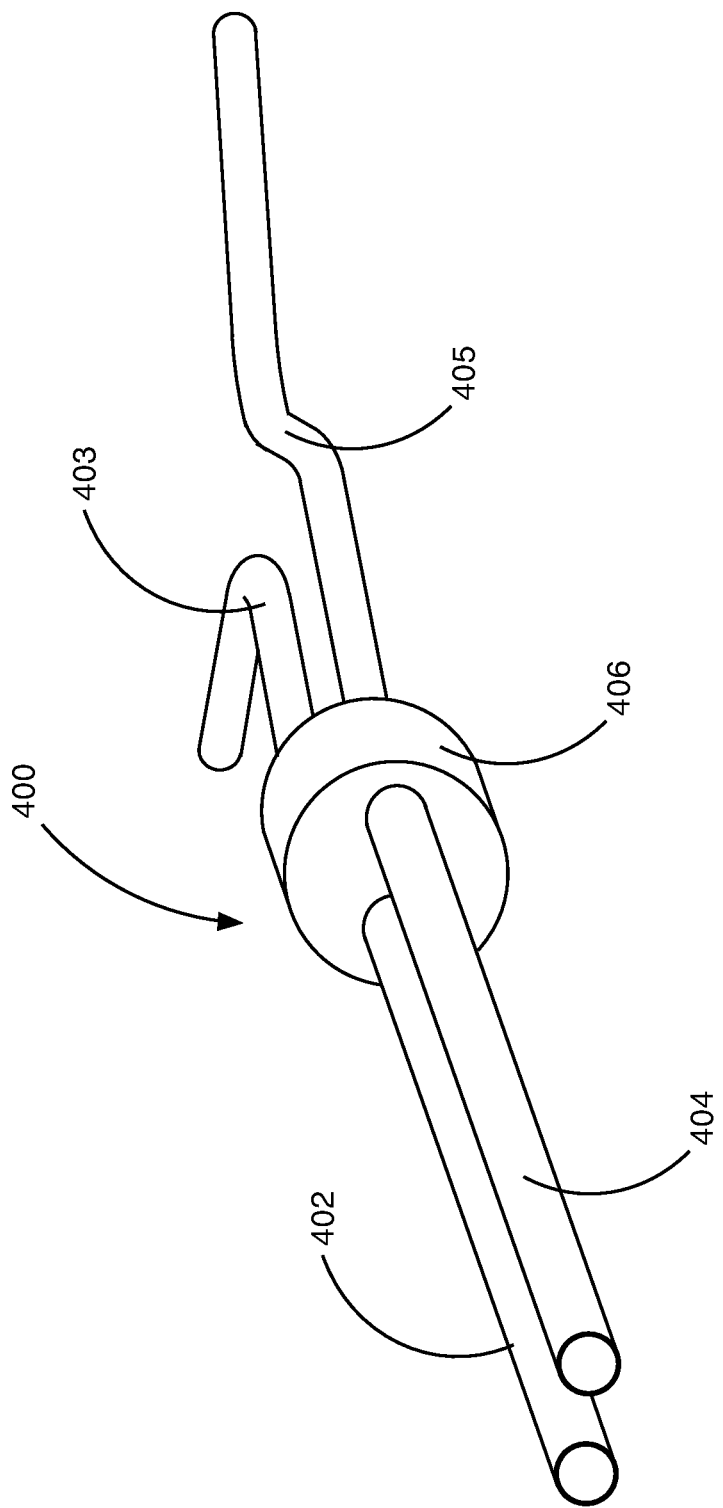
FIG. 11 is a perspective end view of a dual filling nozzle for a hot hole charge system in accordance with the principles of the present invention.

In order to simultaneously fill the borehole and/or charge tube herein described with both an insulator medium and charge medium, a dual filling nozzle, generally indicated at 400, is illustrated in FIG. 11. The filling nozzle is comprised of first and second elongate nozzles 402 and 404 sized to extend substantially the length of the borehole. The nozzle 402 is coupled through pressure tube 403 to a pump system for supplying the insulator medium under pressure through the pressure tube 403, through the coupler 406 and out the nozzle 402 for depositing within the borehole. Likewise, the nozzle 404 is coupled though pressure tube 405 to a pump system for supplying the charge medium under pressure through the pressure tube 405, through the coupler 406 and out the nozzle 404 for depositing in the charge tube of the present invention.

Figure 12:
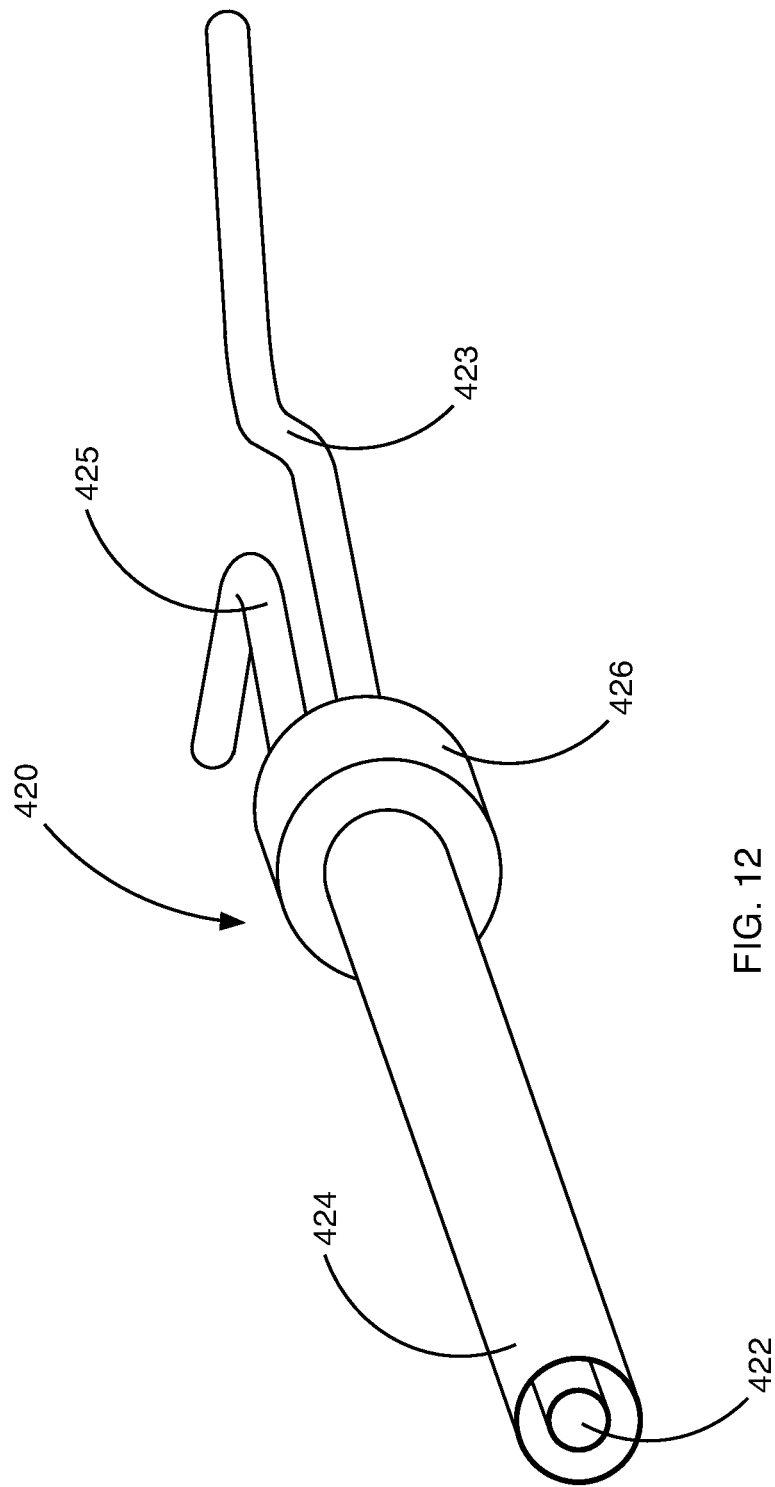
FIG. 12 is a perspective end view of an annular filling nozzle for a hot hole charge system in accordance with the principles of the present invention.
Figure 13:
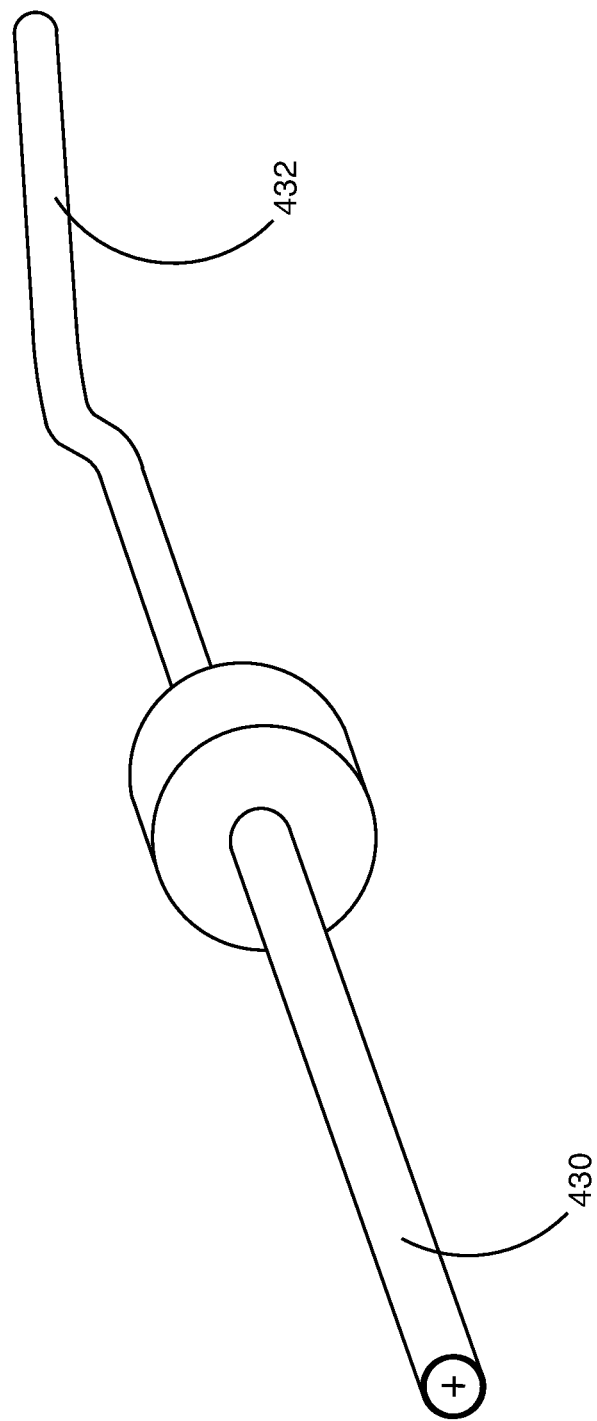
FIG. 13 is a perspective end view of a single filling nozzle for a hot hole charge system in accordance with the principles of the present invention.

In order to simultaneously deposit the charge medium and insulator medium as previously described with reference to FIG. 9, an annular filling nozzle, generally indicated at 420 is shown in FIG. 12. The annular filing nozzle 420 is comprised of a charge medium nozzle 422 surrounded by an insulator medium nozzle 424. The charge medium and insulator medium can then be simultaneously extruded into a borehole by providing such mediums under pressure through respective pressure tubes 423 and 425. The pressure tubes 423 and 425 are coupled to the nozzles 422 and 424, respectively, by the coupler 426 which is configured to route the charge medium from the pressure tube 423 to the nozzle 422 and the insulator medium from the pressure tube 425 to the insulator nozzle 424 without intermixing the insulator medium and the charge medium.

Where it is not necessary to simultaneously extrude the insulator medium and charge medium, a separate single nozzle, such as the nozzle 430 illustrated in FIG. 13, can be used for each medium. The nozzle 430 is coupled to a medium supply pump by pressure tubing 432.

As herein described, the term insulation or insulator medium is intended to encompass any pumpable medium that can fill the space between the charge tube and the borehole that helps to insulate the charge tube, and thus the explosive material contained therein, from extreme borehole temperatures, that is not susceptible to any significant shrinkage as it dries so as to provide superior borehole coupling between the charge tube and the borehole wall so at to provide essentially direct transmission of the shock wave produced by the explosion into the rock formation, and that has a composition that will neutralize any environmentally adverse condition such as a highly acidic environment that can have a detrimental effect on explosive material or that can cause an exothermic reaction within the borehole that can significantly increase the internal temperature of the borehole.

Accordingly, a pumpable insulation medium includes various ingredients and sub-compositions, each of which gives the pumpable medium of the present invention the desired characteristics can properties. Maximum and minimum amounts of each ingredient will allow for changing conditions of pH and temperatures to low to pump thinning at high temperature. In one embodiment, the pumpable insulation medium has the following ingredients, shown in Table 1, by range of approximate percent weight depending on the desired properties and characteristics for a particular borehole environment.

TABLE 1

| Ingredient | Min. % by Weight | Max. % by Weight |
|---|---|---|
| Bentonite | 10% | 60% |
| H2O | 10% | 80% |
| Activated Carbon | 5% | 15% |
| Phosphorus | 2% | 40% |
| Pulp fiber | 1% | 20% |
| Glass balloons | 1% | 20% |
| Borax (dry) | 1% | 5% |
| Starch | 1% | 5% |
| Urea | 1% | 2% |
| Ferrous Silicate | as needed | |
| Lime | as needed | |
| Commercial grade gelling systems | as needed | |

Bentonite is an absorbent aluminum phyllosilicate, essentially comprised of impure clay consisting mostly of montmorillonite. The bentonite can be sodium or calcium based and has excellent water absorption properties. Thus, the bentonite in the mixture acts as a water absorbing material and helps to cause the insulator medium of the present invention to form a water absorbing and thus impermeable water barrier to stop the inflow of water, acid and heat to the charge. In addition, the bentonite acts as a thermal barrier. Bentonite has a relatively low thermal conductivity of between about 1.0 and 1.3 W/mK to can limit heat transfer from the surrounding borehole to the charge medium. Those of skill in the art will recognize that other water absorbing materials with low thermal conductivity could be use in combination or in place of the bentonite.

Water is added to the mixture to provide a desired viscosity of the medium to allow the medium to be pumped into the borehole. Thus, the water acts as a liquefying agent to vary and control the viscosity of the pumpable insulator medium of the present invention. In addition, the water in the insulator medium helps to thermally insulate the charge medium from high temperature downhole conditions. The water acts as a coolant to help maintain the temperature of the charge medium below a predetermined limit (e.g., 150 degrees Fahrenheit). That is, water has a relatively low thermal conductivity (i.e., 0.6 W/mK) and thus is somewhat thermally resistive. Those of skill in the art will recognize that other liquefying agents with low thermal conductivity could be used in combination with or in replacement of water. Mixing the water with the bentonite produces a water/bentonite mixture that can be pumped by existing pump technologies into the borehole. In addition, because the bentonite is a form of clay, as it is pumped into the borehole, it will form around the charge medium, whether contained within a charge tube as previously described herein or extruded contemporaneously with the charge medium into the borehole, it will form or mold itself around the charge medium to substantially fully encapsulate the charge medium within the borehole.

Activated (or active) carbon is a form of carbon that has been processed to make it extremely porous and thus to have a very large surface area available for adsorption or chemical reactions. Adsorption is the adhesion of atoms, ions, biomolecules or molecules of gas, liquid or dissolved solids to the surface of the activated carbon. By using activated carbon with a large surface area, a greater amount of such atoms, ions and molecules will bond to the activated carbon. Activated carbon has been found to adsorb acidic elements and prevent the production of conductive salts and other materials that could adversely affect the charge medium. Thus, the activated carbon acts as an adsorption agent to increase the adsorption properties of the insulator medium in accordance with the principles of the present invention. Those of skill in the art will recognize that other adsorption agents could be used in combination with or in replacement of activated carbon.

Another ingredient that assists in the neutralization of acidic environments that may exist in the borehole is phosphorus. The phosphorus, which may be in the form of a phosphate, is utilized to control pH of the insulator medium when the insulator medium is exposed to an acidic environment. This allows the insulator medium to prevent an otherwise acidic environment from affecting the charge medium that is contained within the insulator medium. Thus, the phosphorus acts as a neutralizing agent to neutralize the pH of the insulator medium when exposed to acidic compounds. Those of skill in the art will recognize that other neutralizing agents could be used in combination with or in replacement of phosphorus.

The pulp fiber is added to the insulator medium, primarily for density control. The pulp fiber is in the form of a lignocellulosic fibrous material prepared by chemically or mechanically separating cellulose fibers from wood, fiber crops or waste paper. The pulp fiber is used to control the density of the insulator medium, but also helps with acid penetration and neutralization through pH control. Thus, the pulp fiber acts as a density control substance. The pulp fiber is combined with a solution of borax and water in a ratio of about 16 ounces per gallon of solution. The amount of water added to the pulp fiber can be used to offset the amount of water added in the formation of the insulator medium of the present invention. Those of skill in the art will recognize, however, that other density control substances, such as glass balloons, could be used in combination with or in replacement of the pulp fiber.

Sodium borate, also known as borax, may be added to the insulator medium in both a liquefied form and in a dry powder form. Borax is used as a buffering agent to control pH of the insulator medium. A buffer solution is formed when borax is added to water. It has the property that the pH of the insulator medium will change very little when exposed to a strong acid. Thus, the borax helps to maintain the pH of the insulator medium at a nearly constant value in order to maintain the charge medium at a desired pH so that the surrounding environment does not adversely affect the charge medium. Those of skill in the art will recognize, however, that other buffering agents could be used in combination with or in replacement of the borax.

If necessary, starch, or amylum, can be added to increase the viscosity of the insulator medium. The starch is a carbohydrate consisting of a large number of glucose units joined together by glycosidic bonds. Thus, the starch acts as a thickening agent for the insulator medium. Those of skill in the art will recognize, however, that other thickening agents, could be used in combination with or in replacement of the starch.

Urea, also known as carbamide, is used to prevent sulfide dust located within the borehole from reacting with AN based explosives. Thus, the urea acts as an chemical inhibitor by reacting with sulfide dust to prevent its further interaction with the explosive medium. In high sulfide deposit areas within the mine, inhibiting sulfide interaction with the explosive or charge medium can prevent unexpected detonation of the charge medium. Those of skill in the art will recognize, however, that other chemical inhibitors could be used in combination with or in replacement of the urea.

Other agents, solutions and/or additives can be included in the insulation medium in accordance with the principles of the present invention. For example, ferrous silicate can be added to adjust the density of the insulator medium. Lime, in the form of calcium oxide or calcium hydroxide, is another substance that can be added to adjust the pH of the insulator medium to a desired level. Other commercial grade gelling materials could also be employed to control viscosity and the suspension of solids within the insulation medium. Those of skill in the art will appreciate that other agents, solutions and/or additives could be added to the insulator medium to modify its properties, such as pH, adsorption or absorption properties, viscosity and density, and thermal insulation properties.

In another embodiment of the present invention, the pumpable insulation medium is configured particularly for sulfide neutralization, where such sulfide environments require neutralization. Accordingly, a 4-10% by weight (CaCl) Calcium Chloride mixture in a solution with a water/sorbitan monooleate (SMO) medium can be added to the composition as set forth in TABLE 1 and further employed to control any catalyst sulfide reaction with the explosives. Moreover, a SMO shear blend can be used to thicken the insulation medium as needed. The necessary thermal barrier can also be achieved by adding in 0.5-4% glass balloons to the mixture as set forth in TABLE 2 below.

TABLE 2

| Ingredient | Min. % by Weight | Max. % by Weight |
| --- | --- | --- |
| H2O | 10% | 80% |
| SMO | 1% | 5% |
| Glass Balloons | 1% | 10% |
| Urea | 1% | 2% |
| CaCl | 2% | 4% |
| Oil (emulsifier) | 4% | 6% |

The SMO and oil are used as emulsifiers. In addition, the SMO is used as a stabilizer and to thicken the insulation medium. Calcium chloride is a salt of calcium and chlorine. In solution, calcium chloride serves as a source of calcium ions. The calcium chloride is capable of neutralizing any catalyst sulfide reaction with the adjacent explosive medium. Thus, the calcium chloride acts as a neutralizing agent. Of course, those of skill in the art will appreciate that other neutralizing agents could be used in combination or replacement of the calcium chloride. The glass balloons also help to increase the thermal resistivity of the insulator medium and thus serve as thermal insulation components. Of course, those of skill in the art will appreciate that other thermal insulation components could be used in combination with or in replacement of the glass balloons. The urea is used for the same purpose described above with reference to urea.

In another embodiment, according to the principles of the present invention, an insulation medium formulation is provided that creates a stable borehole environment for industrial explosives disposed therein. The various ingredients when combined, synergistically, form an insulation medium that will protect the explosive medium from otherwise detrimental borehole conditions that could cause premature ignition of the explosive medium that could injure mining personnel and others that may be near the mine face where the explosive medium has been deposited within one or more boreholes that have been drilled into the mine face. The insulation medium is particularly advantageous when used with industrial explosives containing ammonium nitrate.

The insulation medium of the present invention has particular advantage when used in mine faces in which the temperature environment, i.e., the rock face has a temperature greater than about 150 degrees Fahrenheit. In environments where the rock temperatures within a borehole exceed about 150 degrees Fahrenheit, explosives have been determined unsafe to use. Use of the insulation medium of the present invention in a manner as described herein, however, allows use of such explosives when the borehole temperature of a rock face exceeds 150 degrees Fahrenheit. By using the insulation medium of the present invention, the down hole environment immediately around the explosive material will be maintained at a temperature below 150 degrees Fahrenheit for a period of time sufficient for the installation, clearing and blasting of the explosive materials in both development and production blasting. The formulation of the insulation medium provides a temperature barrier that will prevent heat transfer from the surrounding rock face to the explosive material in the borehole. The insulation medium is primarily comprised of a mixture of clay and water. The water serves as a coolant as well as a carrier for the acid buffering components of the insulation medium. The addition of paper fiber cellulose serves as a thickener. In addition, by soaking the paper fiber cellulose in a water/borax mixture, the borax soaked fiber will serve as a flame suppressant. A borax/phosphate mixture in the insulation medium also helps to achieve a pH of the insulation medium of 8.8 to 9.0. This buffered system is provided to buffer the mine water that is typically acidic with a pH of between about 2.5 and 4.5. Left unbuffered, this caustic mine water can assist in the catalyzing of a sulfide ammonium nitrate reaction, which can lead to a detonation deflagration transition explosive reaction.

The thickening agents used to thicken the insulation medium, such as the paper fiber and starch, hold the water component within the insulation medium and make the water component available for cooling the insulation medium as well as providing a medium by which the buffering components can intermix with the acidic mine water to neutralize the mine water around the explosive medium. In addition, the water is added to the dry ingredients in a sufficient amount to lower the viscosity of the insulation medium to allow the insulation medium to be pumpable into the borehole. To make the product pumpable water is added to the dry ingredients. Accordingly, the formulation of the insulation medium comprises approximately twenty-five percent water by weight. Of course, the amount of water can be increased or decreased to obtain a desired viscosity for proper pumpability of the insulation medium. As previously discussed, the addition of urea serves to inhibit the AN sulfide reaction from taking place. The addition of active carbon to the formulation serves to change the conductivity of the insulation material and allow for the use of electrical blasting techniques.

The amount of water added to the mixture that forms the insulation medium controls the viscosity and thus the pumpability of the insulation material. Thus, the percentage of water by weight in the insulation medium can range from about 25% to 50% with the rest of the ingredients provided in the following percentages by weight:

Clay: 34.7%
Carbon phosphors mix 17%
Paper fiber 1.3%
Borax 3%
Starch 26%
Urea 6.4%

Not only does the insulation medium above provide an insulator for protecting the explosive medium from excessive borehole temperatures, but the insulation medium synergistically provides a shock wave coupler between the explosive medium and the wall of the borehole so that the explosive force generated by the explosive medium during detonation is transferred directly into the surrounding rock without being dampened by the insulation medium. In other words, if a medium having good insulation properties but poor shock coupling were used, the amount of explosive material required to produce the same forces within the adjacent rock would need to be increased, resulting in higher cost and potentially poor detonation results. Thus, the insulation medium of the present invention provides transmission of the explosive energy of the explosive medium when detonated into the rock formation without any significant energy losses as a result of absorption of energy by the insulation medium.

In the foregoing specification, the present invention has been described with reference to specific exemplary embodiments. Various modifications and changes may be made, however, without departing from the spirit and scope of the present invention as set forth in the claims. The specification and figures are illustrative, not restrictive, and modifications are intended to be included within the scope of the present invention. Accordingly, the scope of the present invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims. For example, one or more components, methods or compositions of the hot hole charge system of the present invention could be used with other industrial explosives that are not provided in a liquefied form.

The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

What is claimed:

1. An insulation medium for encapsulating a charge within a borehole, comprising:
   bentonite in a percent by weight of between 10% and 60%;
   a liquefying component in a percent by weight of between 10% and 80%;
   an adsorption component comprising activated carbon in a percent by weight of between 5% and 15%;
   a neutralizing component comprising phosphorous in a percent by weight of between 2% and 40%; and a density control component comprising lignocellulosic fibrous material in a percent by weight of between 1% and 20%.

2. The medium of claim 1, wherein the insulation medium is in a pumpable form for substantially encapsulating a charge tube and substantially filling an annular space between the charge tube and the borehole for insulating the charge tube from a downhole environment in which the charge tube is to be inserted.

3. The medium of claim 2, wherein the charge tube is comprised of an elongate tube having a length and diameter sufficient for containing a desired quantity of a charge medium, a diameter of the charge tube being less than a diameter of a borehole within which the charge tube is to be inserted.

4. The medium of claim 1, wherein the insulation medium further comprises a density control component comprising lignocellulosic fibrous material.

5. The medium of claim 1, wherein the insulation medium further comprises a buffering component comprising borax.

6. The medium of claim 1, wherein the insulation medium further comprises a thickening component.

7. The medium of claim 1, wherein the insulation medium further comprises a chemical inhibitor.

8. The medium of claim 4, wherein the density control component is in a weight percent of between about 1 percent and 20 percent.

9. The medium of claim 5, wherein the buffering component is in a weight percent of between about 1 percent and 5 percent.

10. The medium of claim 6, wherein the thickening component is in a weight percent of between about 1 percent and 5 percent.

11. The medium of claim 7, wherein the chemical inhibitor is in a weight percent of between about 1 percent and 2 percent.

12. An insulation medium for encapsulating a charge within a borehole, comprising:
    bentonite;
    water;
    an adsorption component comprising activated carbon; a neutralizing component comprising phosphorous; and
    a density control component comprising lignocellulosic fibrous material of between about 1 percent and 20 percent.

13. The medium of claim 12, wherein the insulation medium further comprises a buffering component comprising borax in a weight percent of between about 1 percent and 5 percent.

14. The medium of claim 12, wherein the insulation medium further comprises a thickening component comprising at least one of starch or amylum in a weight percent of between about 1 percent and 5 percent.

15. The medium of claim 12, wherein the insulation medium further comprises a chemical inhibitor comprising urea in a weight percent of between about 1 percent and 2 percent.

16. The medium of claim 12, wherein the bentonite is in a weight percent of between about 10 and 60 percent, the water is in a weight percent of between about 10 percent and 80 percent, the adsorption component is in a weight percent of between about 5 percent and 15 percent, and the neutralizing component is in a weight percent of between about 2 percent and 40 percent.

* * * * *